US008131252B2

(12) United States Patent
Soh et al.

(10) Patent No.: US 8,131,252 B2
(45) Date of Patent: Mar. 6, 2012

(54) METHOD AND MEDIUM FOR ANALYZING ENVIRONMENT OF DEVICE AND DEVICE USING THE SAME

(75) Inventors: Byung-seok Soh, Suwon-si (KR); Kyu-yong Kim, Yongin-si (KR); Yeun-bae Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 988 days.

(21) Appl. No.: 11/898,782

(22) Filed: Sep. 14, 2007

(65) Prior Publication Data

US 2008/0132196 A1 Jun. 5, 2008

(30) Foreign Application Priority Data

Dec. 1, 2006 (KR) .................. 10-2006-0120789

(51) Int. Cl.
*H04M 11/04* (2006.01)
(52) U.S. Cl. .................. 455/404.1; 455/404.2; 455/423; 455/456.1; 455/557; 455/567
(58) Field of Classification Search .............. 455/404.1, 455/404.2, 423, 456.1, 557, 567
See application file for complete search history.

(56) References Cited

U.S. PATENT DOCUMENTS

| 7,430,439 B2 * | 9/2008 | Griffin et al. ............. 455/552.1 |
| 7,702,282 B2 * | 4/2010 | Sandegard et al. .......... 455/41.2 |
| 2003/0228881 A1 * | 12/2003 | Yamamoto et al. ........ 455/550.1 |
| 2004/0189484 A1 * | 9/2004 | Li ............................. 340/825.19 |
| 2005/0208903 A1 | 9/2005 | Sakamoto |
| 2007/0254627 A1 * | 11/2007 | Kikuchi et al. ............. 455/404.2 |
| 2008/0204266 A1 * | 8/2008 | Malmberg et al. ............ 340/683 |

FOREIGN PATENT DOCUMENTS

| EP | 1686776 | 8/2006 |
| JP | 2002-305564 | 10/2002 |
| JP | 2004-129120 | 4/2004 |
| KR | 2002-0067724 | 8/2002 |
| KR | 10-2005-0110374 | 11/2005 |
| KR | 10-2006-0008006 | 1/2006 |
| KR | 10-2006-0061618 | 6/2006 |
| KR | 10-2006-0071007 | 6/2006 |
| WO | 2006-057770 | 6/2006 |

OTHER PUBLICATIONS

European Search Report dated Feb. 1, 2008, issued in corresponding European Patent Application.
European of Communication dated Apr. 11, 2011, issued in corresponding European Application No. 07120315.2.
Chinese Office Action dated Jun. 22, 2011 issued in Chinese Application No. 200710196319.6.

* cited by examiner

*Primary Examiner* — Sanh Phu
(74) *Attorney, Agent, or Firm* — Staas & Halsey LLP

(57) ABSTRACT

Provided are a method and medium for analyzing an environment of a device and a device using the same. A device may include a vibration unit to cause the device to vibrate, a sensing unit to sense vibration of the device, wherein the sensed vibration forms a vibration pattern and a judgment unit to judge an environment of the device according to a vibration pattern of the device sensed by the sensing unit.

24 Claims, 15 Drawing Sheets

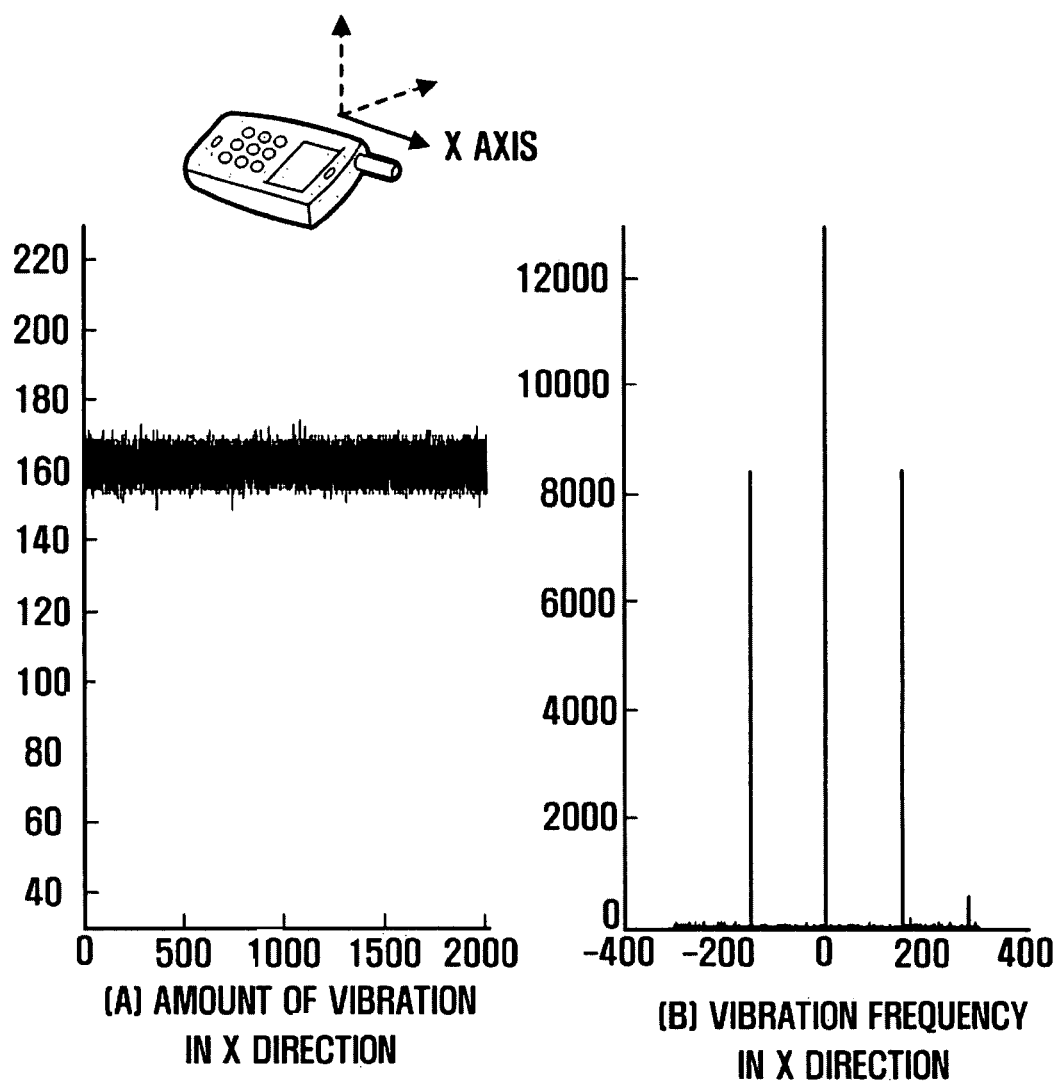

(A) AMOUNT OF VIBRATION IN Y DIRECTION (B) VIBRATION FREQUENCY IN Y DIRECTION

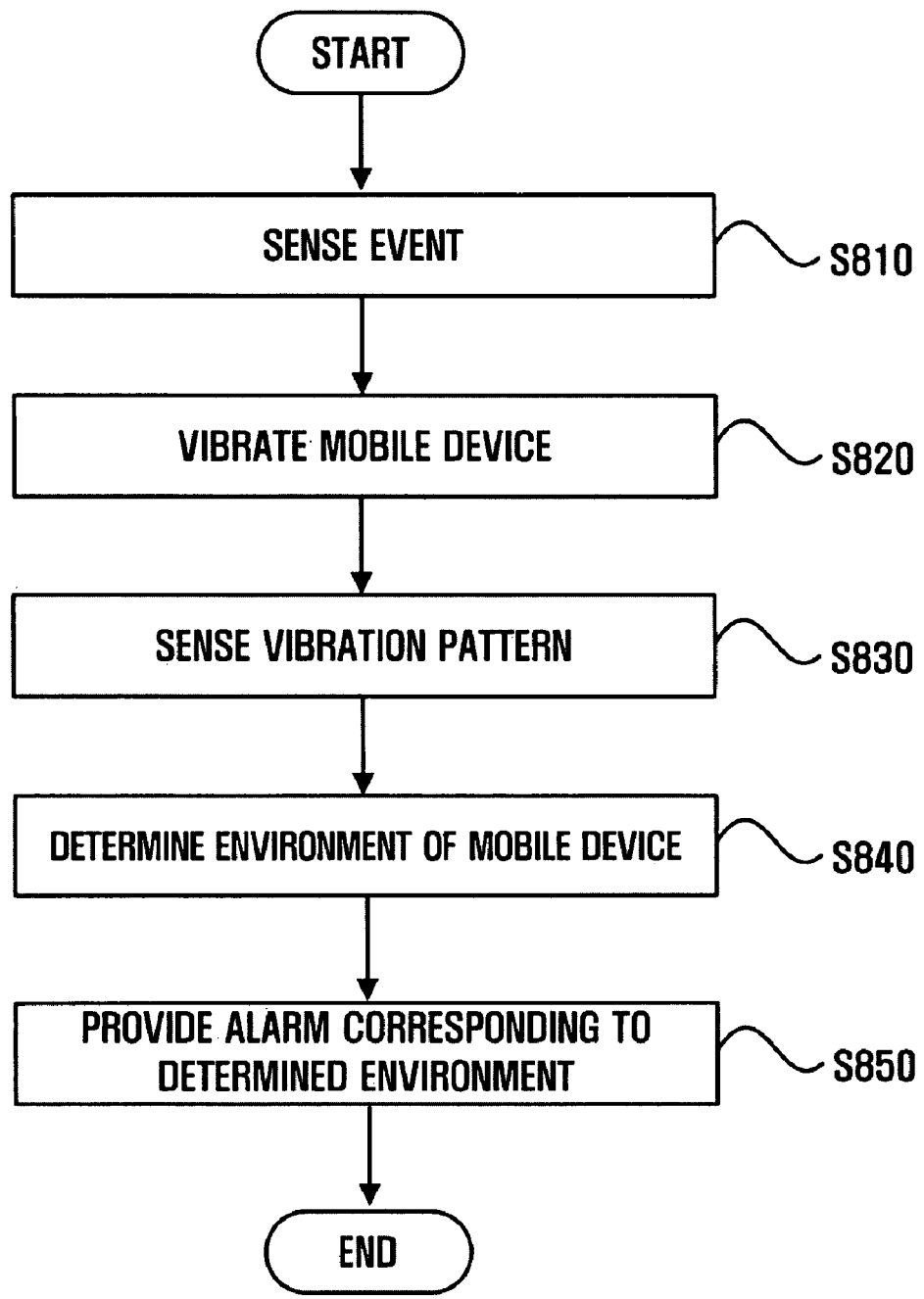

ively used. The mobile devices may generate a plurality of events, such as the receipt of a call and the advent of a schedule, depending on the purpose of use, and may output an audio alarm set beforehand so as to let the user know that an event is generated.

METHOD AND MEDIUM FOR ANALYZING ENVIRONMENT OF DEVICE AND DEVICE USING THE SAME

CROSS-REFERENCE TO RELATED APPLICATIONS

This application claims priority benefit from Korean Patent Application No. 10-2006-0120789 filed on Dec. 1, 2006 in the Korean Intellectual Property Office, the disclosure of which is incorporated herein by reference in its entirety.

BACKGROUND

1. Field

Embodiments relate to a device, and in particular, to a technology of analyzing an environment of a device and providing an appropriate alarm on the basis of the analysis result.

2. Description of the Related Art

Recently, with the rapid development of the mobile communication technology and digital processing technology, mobile devices, such as mobile phones and PDAs (Portable Digital Assistants), have been widely used. The mobile devices may generate a plurality of events, such as the receipt of a call and the advent of a schedule, depending on the purpose of use, and may output an audio alarm set beforehand so as to let the user know that an event is generated.

However, since the audio alarm to be output may disturb other people as noise, the user sets the mobile device to a vibration mode. In the vibration mode, the mobile device vibrates to let the user know that the event is generated. According to the related art, since the strength of the vibration is constant, the vibration mode may be inconvenient depending on a situation where the user holds the mobile device.

For example, when the mobile device is placed in a pocket, the user may not feel the vibration. Further, when the mobile device is placed on a desk, noise may occur due to the vibration of the mobile device that is, the user may not be able to instantly respond to an event generated on the mobile device or may feel inconvenience due to the vibration.

Accordingly, there is a need for a technology that uses an appropriate type of alarm according to a mobile device environment so as to let the user know that an event is generated (an event has occurred).

SUMMARY

Embodiments relate to analyzing an environment of a device when an event is generated and relate to supplying an appropriate alarm according to the analyzed environment.

According to an aspect of embodiments, there is provided a device, the device including a vibration unit to cause the device to vibrate, a sensing unit to sense vibration of the device, wherein the sensed vibration forms a vibration pattern, and a judgment unit to judge an environment of the device according to the vibration pattern of the device sensed by the sensing unit.

According to another aspect of embodiments, there is provided a method of analyzing an environment of a device, the method including causing a device to vibrate, sensing vibration of the device, wherein the sensed vibration forms a vibration pattern, and judging an environment of the device according to the sensed vibration pattern of the device.

According to still another aspect of embodiments, there is provided a device, the device including a vibration unit to cause the device to vibrate, and an alarm processing unit to provide an alarm corresponding to a sensed vibration pattern of the device.

According to yet still another aspect of embodiments, there is provided a method of generating a dynamic alarm, the method including causing a device to vibrate, and providing an alarm corresponding to a sensed vibration pattern of the device.

According to another aspect, there is provided at least one computer readable medium storing computer readable instructions to implement methods of embodiments.

BRIEF DESCRIPTION OF THE DRAWINGS

These and/or other aspects, features, and advantages will become apparent and more readily appreciated from the following description of exemplary embodiments, taken in conjunction with the accompanying drawings of which:

FIG. 8 is a flowchart illustrating a process of generating an alarm according to an exemplary embodiment.

DETAILED DESCRIPTION OF EMBODIMENTS

Figure 1:
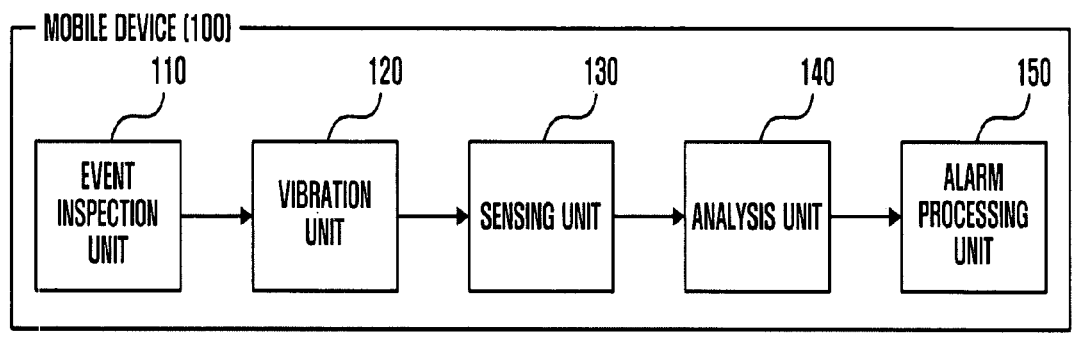
FIG. 1 is a block diagram illustrating a device according to an exemplary embodiment.

Reference will now be made in detail to exemplary embodiments, examples of which are illustrated in the accompanying drawings, wherein like reference numerals refer to the like elements throughout. Exemplary embodiments are described below by referring to the figures.

FIG. 1 is a block diagram illustrating a device 100 according to an exemplary embodiment. The device 100 includes an event inspection unit 110, a vibration unit 120, a sensing unit 130, an analysis unit 140, and an alarm processing unit 150. The device 100 is a portable computer device having data arithmetic processing ability, such as, content play, schedule management, phone call, and image capture. Examples of the device 100 may include a mobile phone, a PDA (Personal Digital Assistant), and a PMP (Portable Multimedia Player). However, the device 100 according to an exemplary embodiment is not limited to the above mobile devices.

The event inspection unit 110 inspects an event generated in the device 100. Examples of the event may include the receipt of a call signal, the advent of a prescribed schedule or an anniversary, or the completion of a specific job (for example, the end of file transfer or download and the completion of content play). Of course, the kinds of events are not limited thereto, and various kinds of events may exist according to the function or purpose of the device 100.

The vibration unit 120 causes the device 100 to vibrate. Preferably, the vibration unit 120 causes the device 100 to vibrate when an event is generated on the device 100. Here, it is preferable that the vibration is generated for a predetermined time. According to an exemplary embodiment, the vibration unit 120 may generate a vibration for two purposes. First, the vibration unit 120 may generate a vibration to analyze the environment of the device 100. At this time, the strength of the vibration may not be easily felt by the user. Second, the vibration unit 120 may generate a vibration to inform the user that an event is generated. At this time, the strength of the vibration may vary on the basis of the environment of the device 100. The strength of the vibration may be set to a desired value on the basis of the use environment or the kind of the device 100. The vibration unit 120 may have a vibration generator, such as a linear vibrator or an eccentric motor, or an impact generator, such as a force reactor.

The sensing unit 130 senses a vibration pattern of the device 100. The sensing unit 130 may perform a sensing operation when the vibration unit 120 generates the vibration. To this end, the sensing unit 130 may be synchronized with the vibration unit 120. Examples of the vibration pattern to be sensed by the sensing unit 130 may include the amount of the vibration and a vibration frequency.

Figure 2:
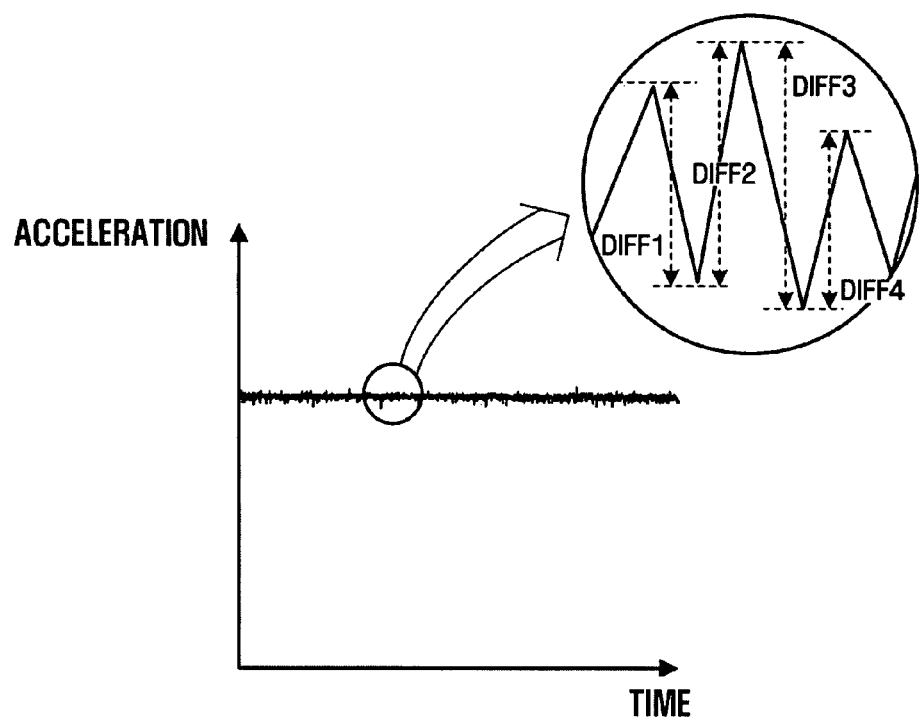
FIG. 2 is a diagram illustrating a method of measuring a vibration according to an exemplary embodiment.

In order to sense the vibration pattern of the device 100, the sensing unit 130 may measure an acceleration to be applied to the device 100 on the basis of a predetermined reference axis. The acceleration measured when the device 100 vibrates is not uniform, as shown in FIG. 2. Here, differences DIFF1, DIFF2, DIFF3, and DIFF4 between upper and lower peaks may denote the amount of the vibration.

The acceleration of the device 100 may be measured on the basis of a plurality of reference axes. More preferably, the sensing unit 130 may measure the acceleration of the device 100 with respect to three reference axes perpendicular to one another so as to accurately sense the vibration pattern of the device 100.

The sensing unit 130 may be implemented by an inertia sensor, such as an accelerometer, a gyroscope, a shock sensor, and a tilt sensor. Of course, embodiments are not limited thereto. The sensing unit 130 may be implemented by another type of sensor that can sense the vibration pattern of the device 100.

The analysis unit 140 determines the environment of the device 100 on the basis of the sensing result of the sensing unit 130. To this end, the analysis unit 140 may search a reference pattern that is most similar to the vibration pattern sensed by the sensing unit 130 from among a plurality of reference patterns. Here, the reference pattern represents a standard corresponding to the vibration pattern measured beforehand on the basis of the environment of the device 100. That is, the reference pattern may be set beforehand through a preliminary experiment when the device 100 is produced. Therefore, when a reference pattern that is most similar to the vibration pattern received from the sensing unit 130 is searched, the analysis unit 140 can judge that the environment corresponding to the searched reference pattern is a current environment of the device 100.

The environment of the device 100 denotes a situation where the user holds the device 100. For example, the environment may be a state where the device 100 is held in a user's hand, a state where the device 100 is placed on the desk, or a state where the device 100 is placed in a pocket of a user's clothes (e.g. user's jumper, back pocket of user's pants, etc.). The environment to be applied may vary according to exemplary embodiments.

FIGS. 3A to 6C are graphs illustrating reference patterns depending on the environment according to an exemplary embodiment. The reference patterns shown in the drawings indicate the amount of vibration and the vibration frequency to be sensed by the sensing unit 130 with respect to the three axes X, Y, and Z in each environment when the vibration unit 120 causes the device 100 to vibrate.

Figure 3B:
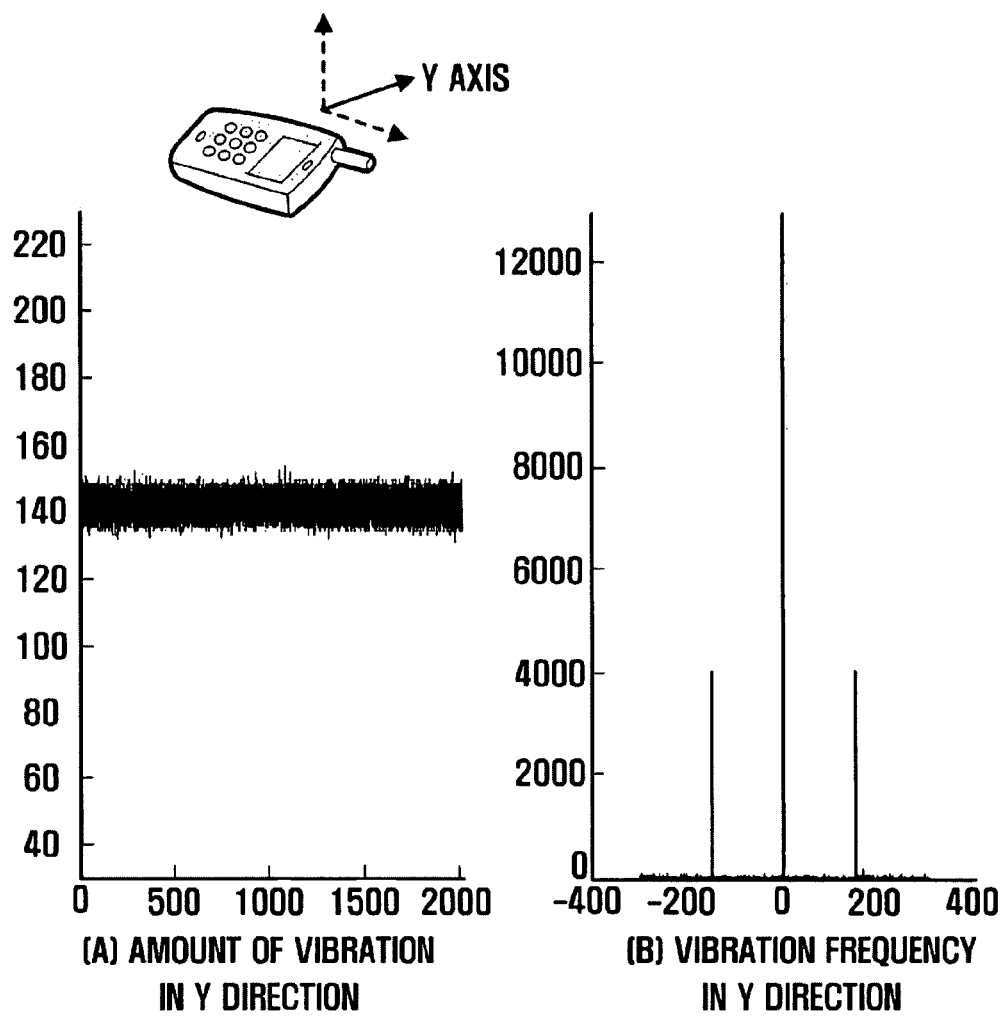
FIGS. 3A to 6C are graphs illustrating reference patterns according to an exemplary embodiment.
Figure 3C:
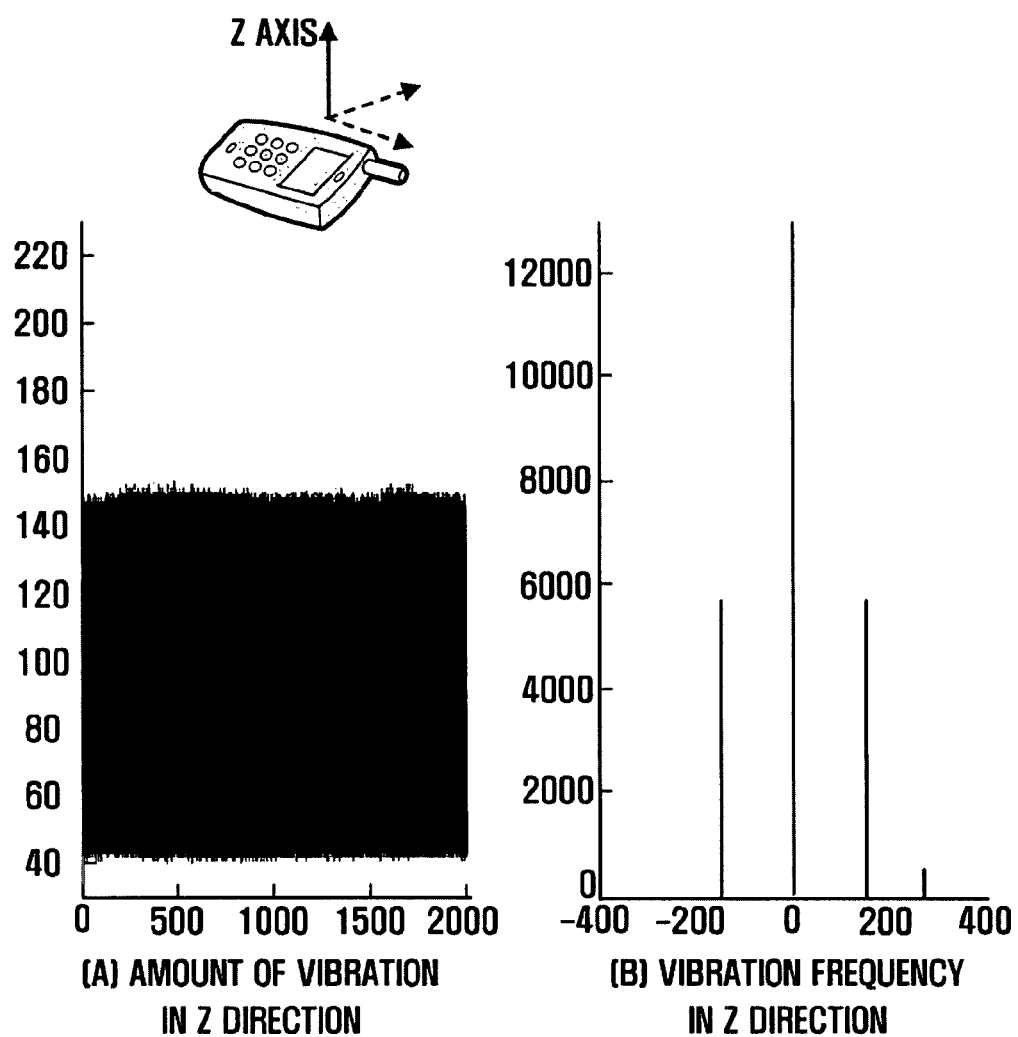
Figure 4A:
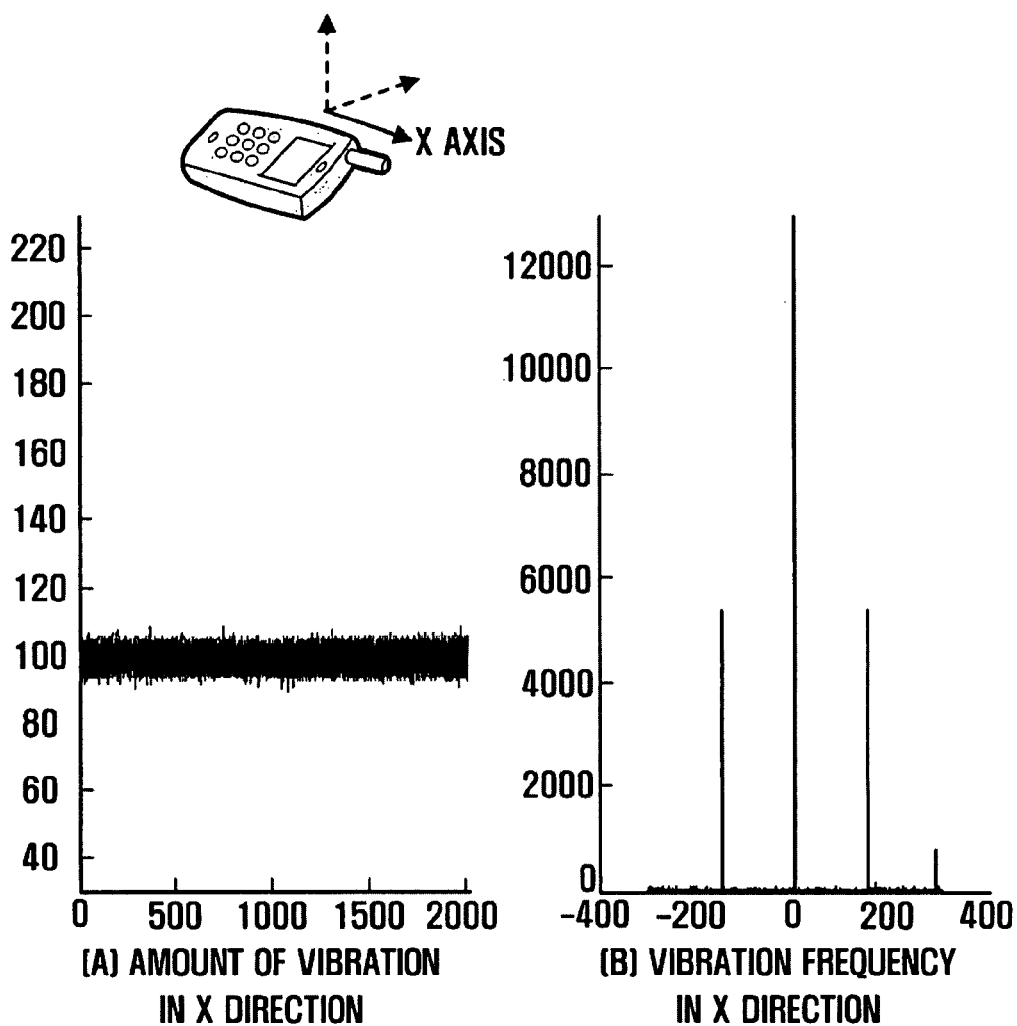
Figure 4B:
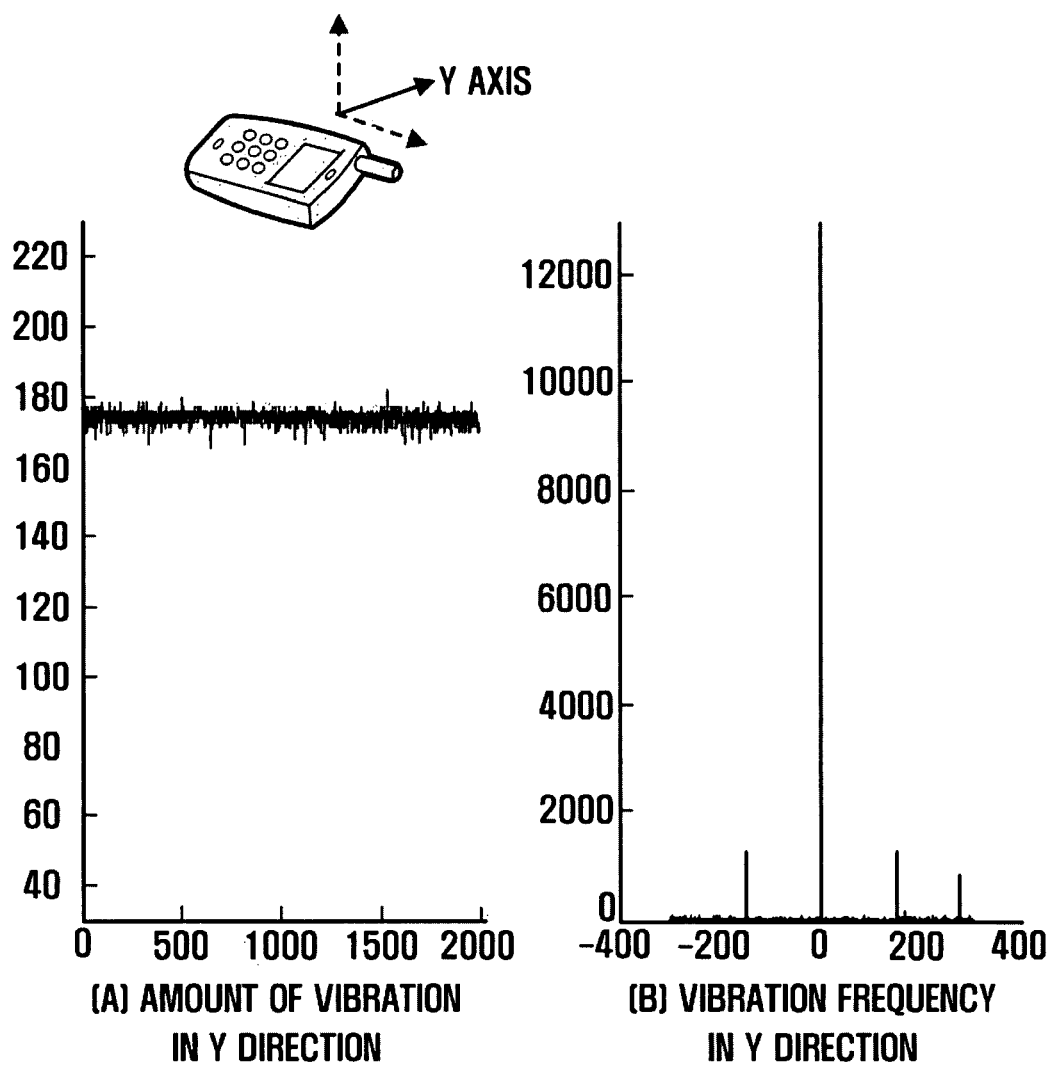
Figure 4C:
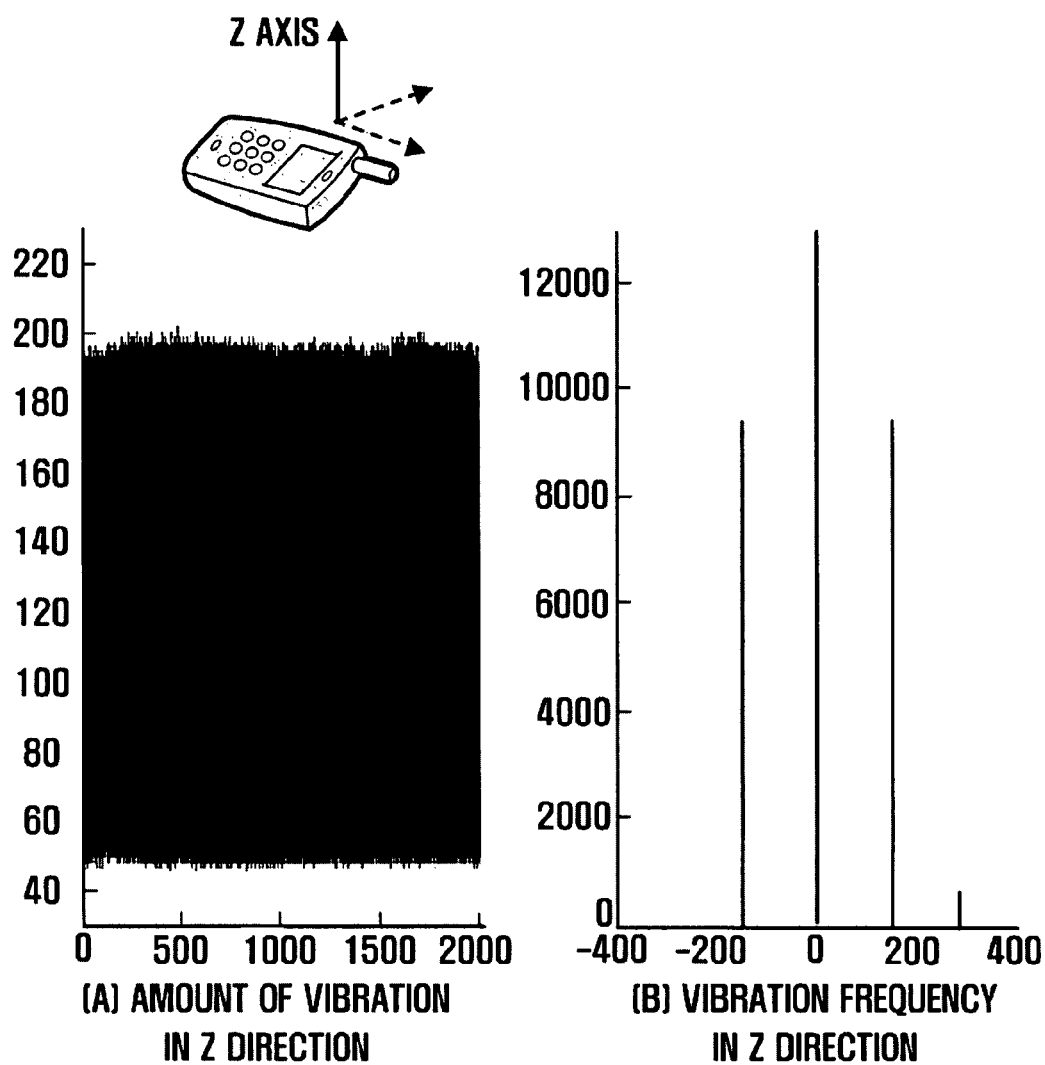
Figure 5A:
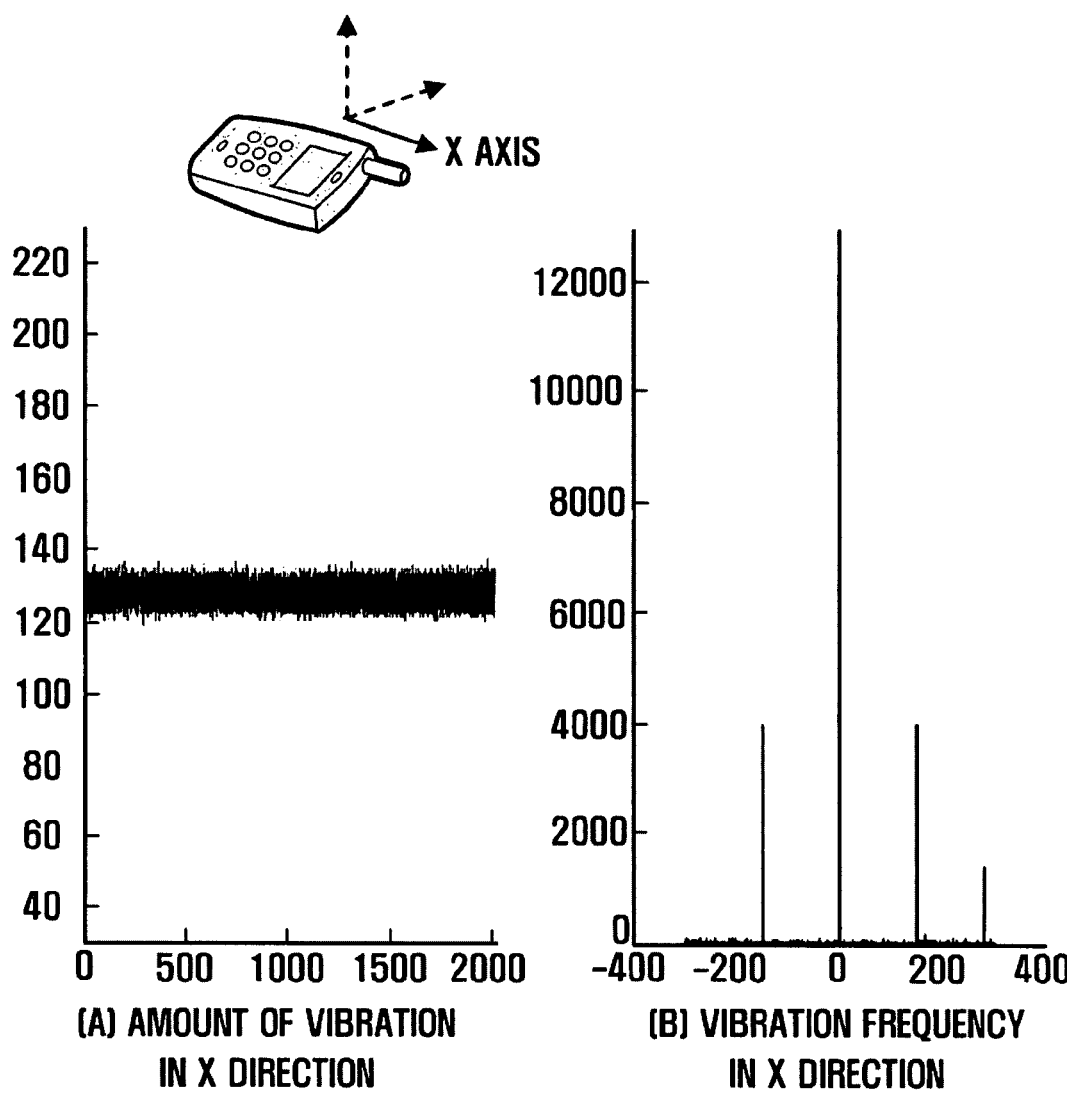
Figure 5B:
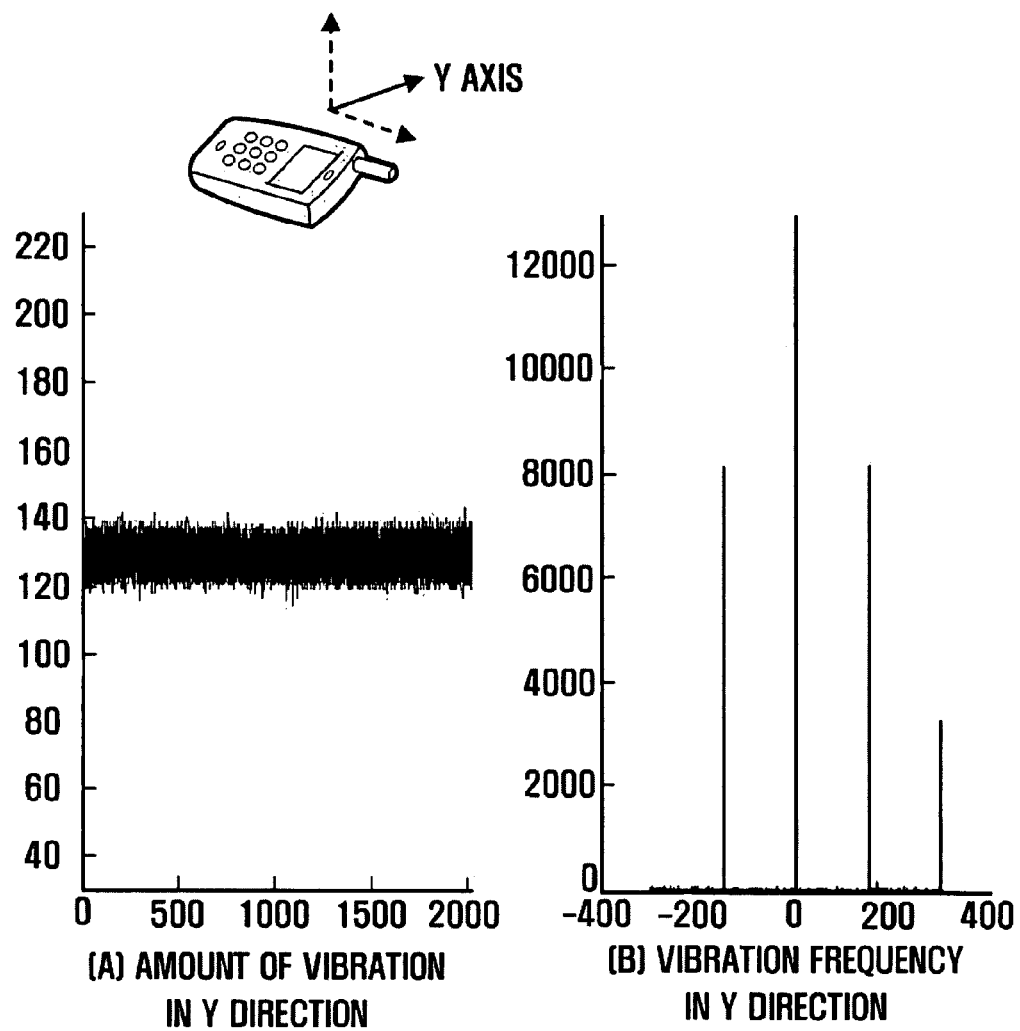
Figure 5C:
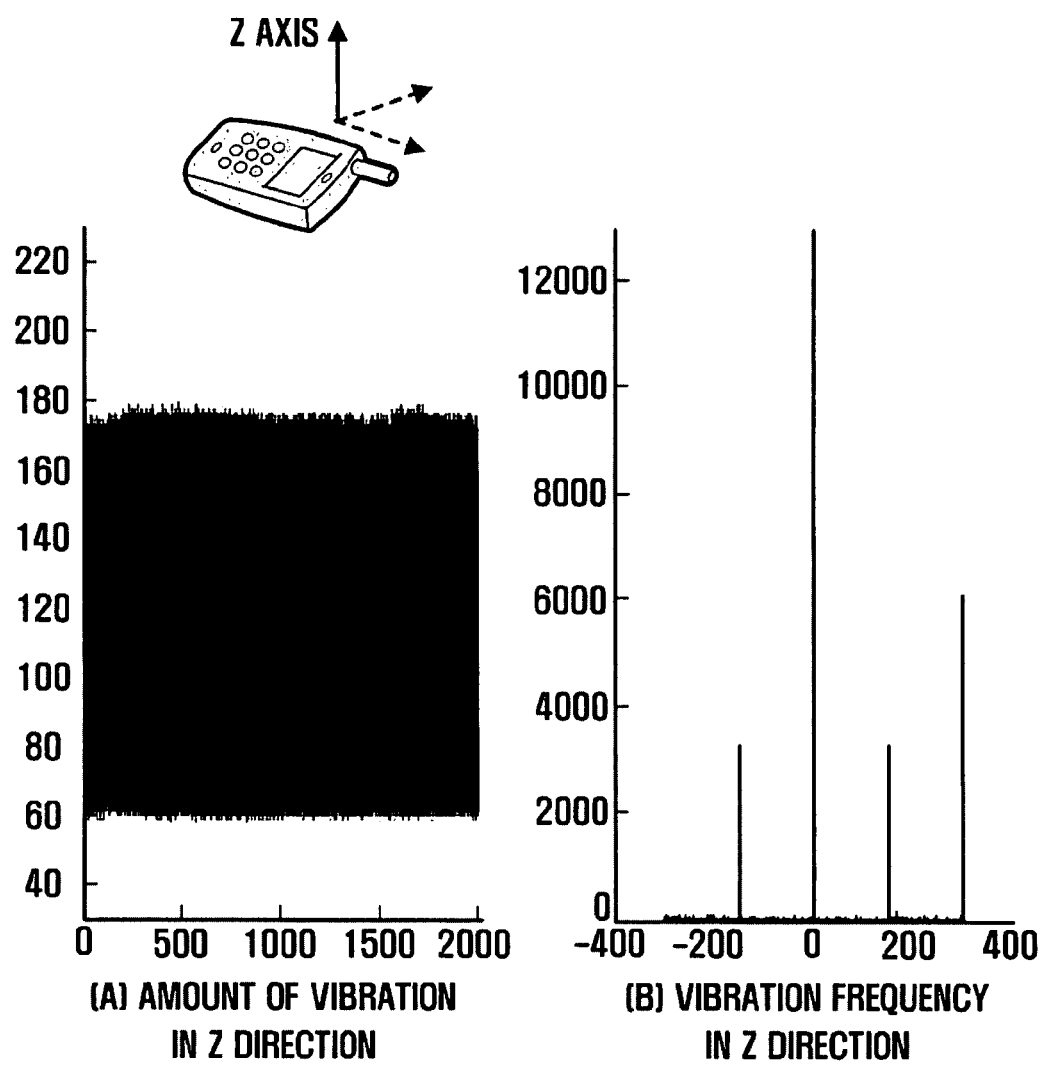
Figure 6A:
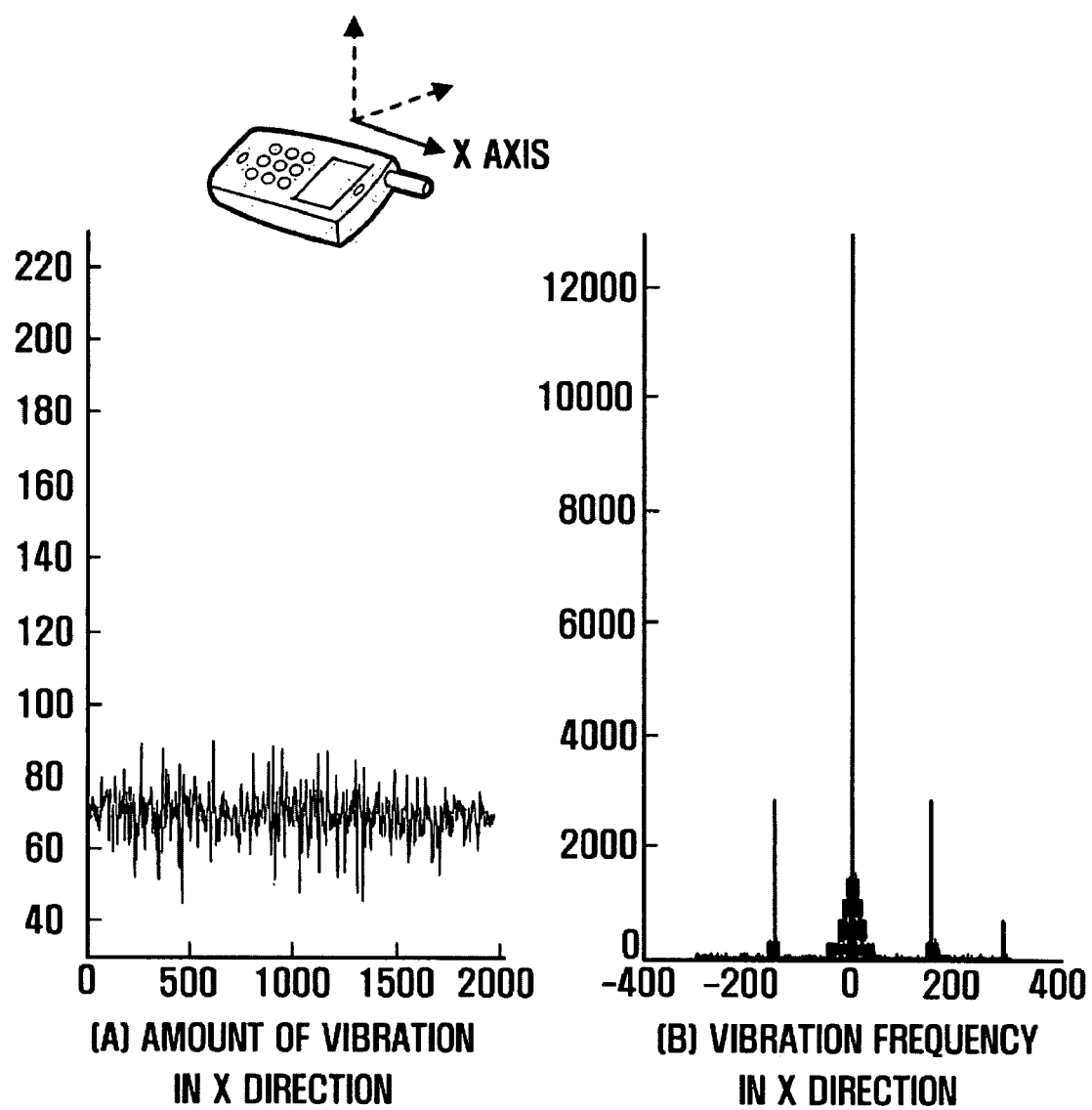
Figure 6B:
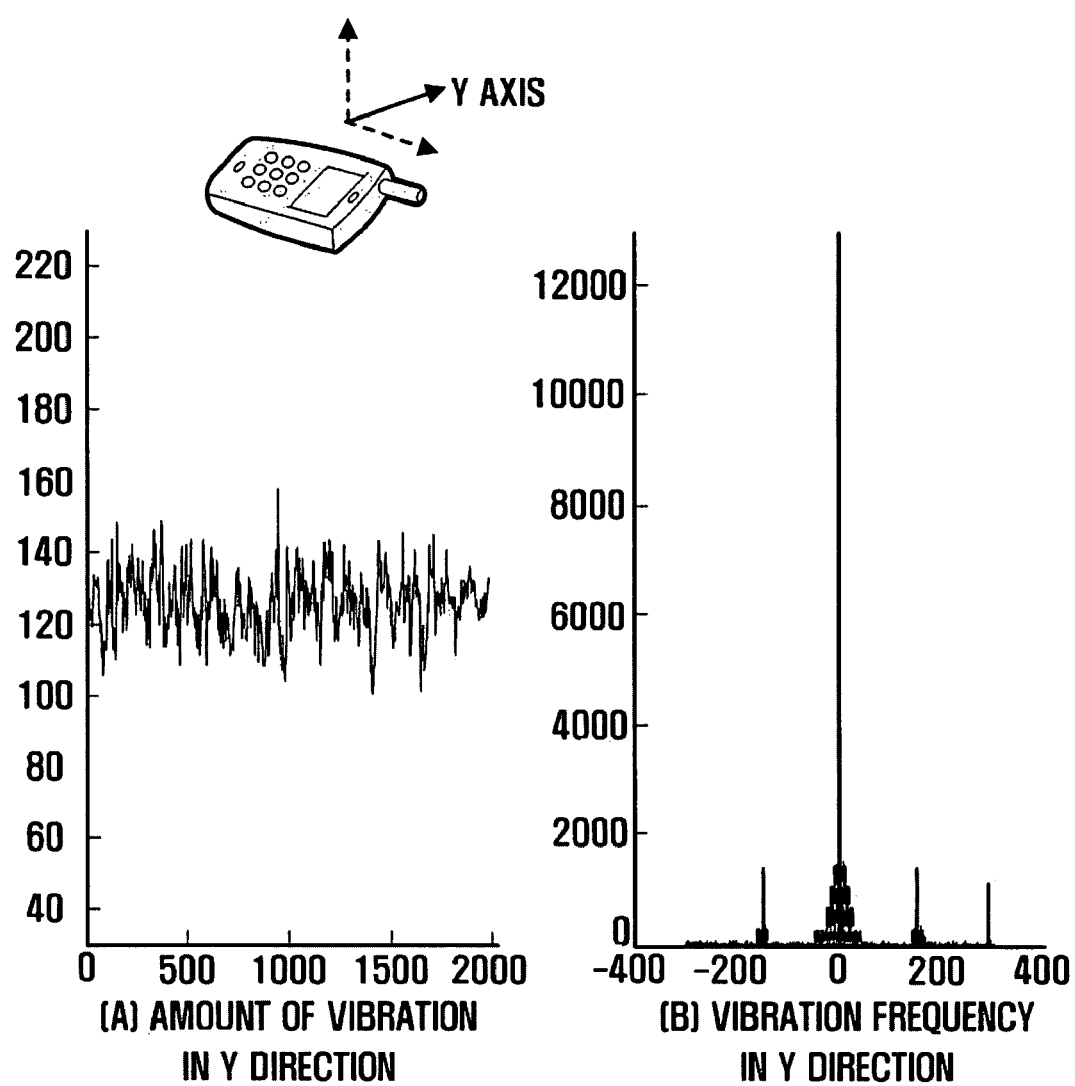
Figure 6C:
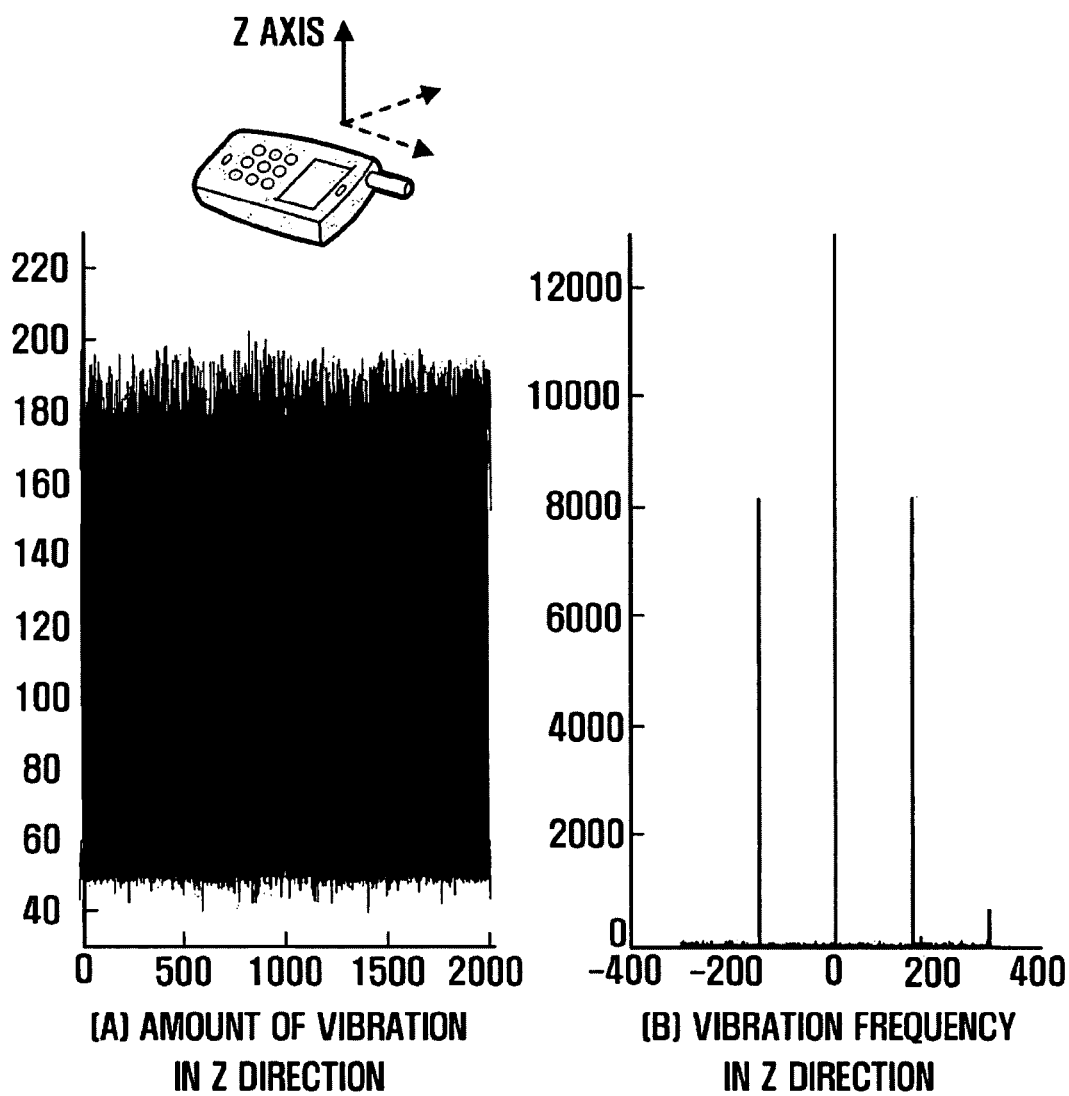

In particular, FIGS. 3A to 3C show the reference patterns with respect to the reference axes X, Y, and Z when the device 100 is held in the user's hand. FIGS. 4A to 4C show the reference patterns with respect to the reference axes X, Y, and Z when the device 100 is placed in the pocket of a user's jumper. Further, FIGS. 5A to 5C show the reference patterns with respect to the reference axes X, Y, and Z when the device 100 is placed on the desk. FIGS. 6A to 6C show the reference patterns with respect to the reference axes X, Y, and Z when the device 100 is placed in the back pocket of the pants of the user who is walking. When the device 100 is placed in the back pocket of the pants of the user who is walking, the movement of the user has an effect on the device 100. Accordingly, the reference patterns are more irregular than other environments, as shown in FIGS. 6A to 6C.

As will be apparent from the reference patterns, the vibration pattern of the device 100 sensed by the sensing unit 130 shows different characteristics depending on the environment of the device 100. Therefore, the current environment of the device 100 can be distinguished by comparing the sensed pattern output from the sensing unit 130 with the reference patterns.

The alarm processing unit 150 provides an alarm corresponding to the analysis result of the analysis unit 140. The vibration may be one type of alarm. Here, the strength of the vibration may vary according to the environment of the device 100. For example, in a case where the environment indicates "in the user's hand" or "on the desk", a weak vibration may be provided. In a case where the environment indicates "in the jumper pocket of the user", a strong vibration may be provided. In addition, in a case where the environment indicates "in the back pocket of the pants of the user", a medium vibration may be provided. Of course, as well as the strength of the vibration, a vibration generation pattern may vary according to the environment. For example, in a case where the environment indicates "in the back pocket of the pants of the user who is walking", the strength of the vibration may be dynamically changed. In a case where the environment indicates "in the back pocket of the pants of the user who is not moving", the vibration having a predetermined strength may be provided.

The type of alarm is not limited to the vibration. For example, sound or lamp lighting may be used. When sound is used for the alarm, the volume of sound may vary according to the environment. Further, it is possible to provide the alarm by combining two or more among the vibration, sound, and lamp lighting. For example, in a case where the environment indicates "on the desk", the alarm processing unit 150 may output a weak vibration and sound. The types of alarm are not intended to limit embodiments. It should be understood that an exemplary embodiment, in which a different alarm is appropriately provided according to the environment of the device 100 judged by the analysis unit 140 still falls within the scope of embodiments.

A format (the strength of the vibration, the volume of sound, and the type of the alarm) for providing an alarm corresponding to each environment may be set by a default or may be set by the user. The device 100 may further include a user input unit (not shown), such as a keypad, a touch pad, or a touch screen, or may include a display unit (not shown), such as an LCD (Liquid Crystal Display) or a PDP (Plasma Display Panel).

Figure 7:
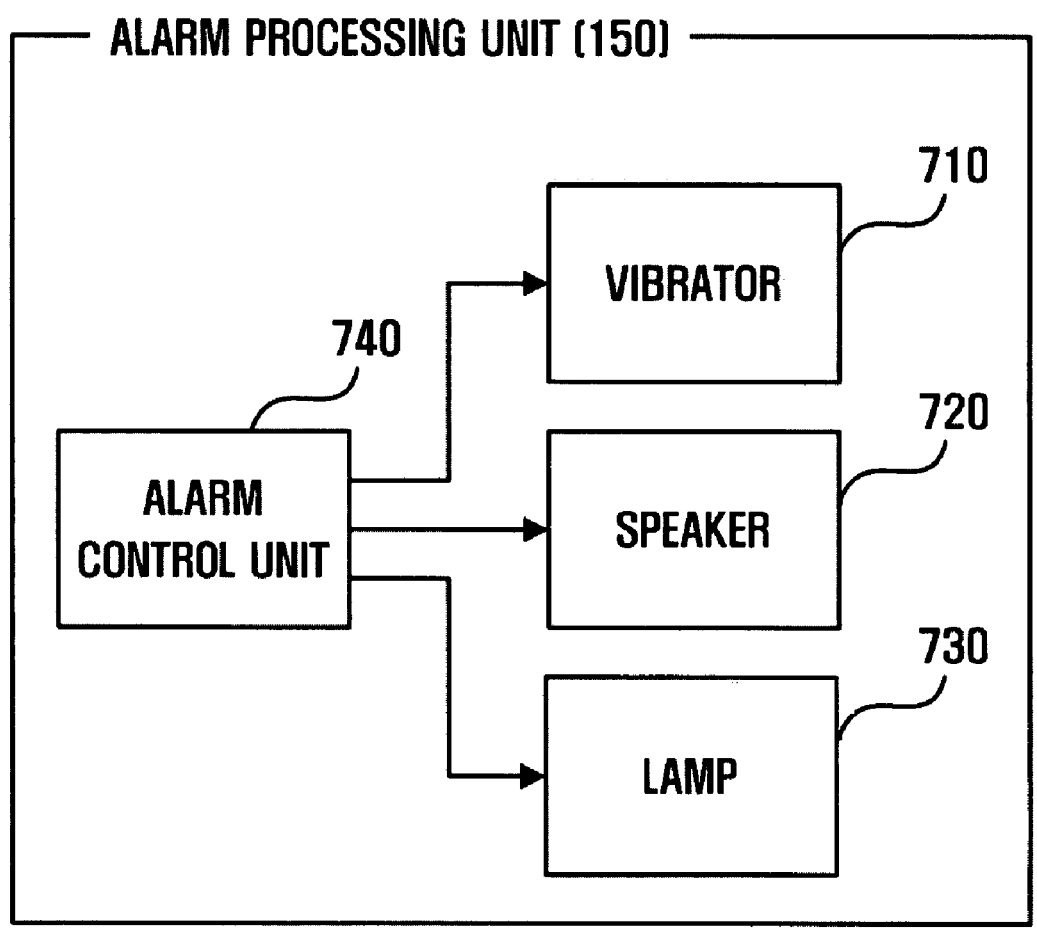
FIG. 7 is a block diagram illustrating an alarm processing unit shown in FIG. 1.

As shown in FIG. 7, the alarm processing unit 150 may include a vibrator 710 that generates a vibration, a speaker 720 that generates sound, and a lamp 730. Further, the alarm processing unit 150 may include an alarm control unit 740 that controls the vibrator 710, the speaker 720, and the lamp 730. Here, the alarm control unit 740 may store information corresponding to the format for providing an alarm according to the environment of the device 100 and cause an appropriate alarm to be provided using the information.

As an exemplary embodiment different from an exemplary embodiment shown in FIG. 7, even though the vibration is used to provide an alarm, the alarm processing unit 150 may not include the vibrator 710. In this case, the alarm using the vibration may be provided by the vibration unit 120 shown in FIG. 1. That is, in order to provide the alarm, the alarm control unit 740 requests the vibration unit 120 to generate the vibration at an appropriate strength. Then, the vibration unit 120 may generate the vibration according to the request of the alarm control unit 740. In exemplary embodiment, the vibration generated by the vibration unit 120 may be divided into two kinds. A first vibration is used to check the environment of the device 100. If an event occurs, the first vibration may be provided for a predetermined time. A second vibration is used to inform the user that the event is generated. When the environment of the device 100 is determined using the first vibration, the vibration unit 120 generates the second vibration according to the request of the alarm control unit 740. Of course, while the vibration unit 120 generates the second vibration, the sensing unit 130 does not need to sense the vibration pattern of the device 100.

FIG. 8 is a flowchart illustrating a process of generating an alarm according to an exemplary embodiment. Each step in the flowchart of FIG. 8 is performed by the device 100 described with reference to FIG. 1.

First, when the event inspection unit 110 senses an event generated on the device 100 (Step S810), the vibration unit 120 causes the device 100 to vibrate (Step S820).

When the device 100 vibrates, the sensing unit 130 senses a vibration pattern of the device 100 (Step S830).

Next, the analysis unit 140 determines an environment of the device 100 using the vibration pattern of the device 100 sensed by the sensing unit 130 (Step S840). As described above, the analysis unit 140 may compare the vibration pattern and the prescribed reference pattern in order to perform Step S840.

Thereafter, the alarm processing unit 150 provides an alarm corresponding to the environment determined by the analysis unit 140 (Step S850). Of course, the alarm processing unit 150 may not directly provide the alarm and control other components included in the device 100 to supply the alarm. For example, as described above, the alarm processing unit 150 may request the vibration unit 120 to generate the vibration at a predetermined strength. Further, the vibration unit 120 may cause the device 100 to vibrate at a predetermined strength on the basis of the request from the alarm processing unit 150.

In addition to the above-described exemplary embodiments, exemplary embodiments can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), and hardware storage devices (e.g., read only memory media, random access memory media, flash memories, etc.). The medium/media may also be a distributed network, so that the computer readable code/instructions are stored and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of embodiments, or they may be of the kind well-known and available to those skilled in the art of computer hardware and/or computer software.

As described above, the method and medium for analyzing an environment of a device and the device using the same according to exemplary embodiments may provide an appropriate alarm on the basis of the environment of the device when an event is generated.

Although a few exemplary embodiments have been shown and described, it would be appreciated by those skilled in the art that changes may be made in these exemplary embodiments, the scope of embodiments being defined in the claims and their equivalents.

What is claimed is:

1. A device having a predetermined data arithmetic processing ability, the device comprising:
   a vibration unit to cause the device to vibrate;
   a sensing unit to sense vibration of the device, wherein the sensed vibration forms a vibration pattern;
   a judgment unit to judge an environment of the device according to the vibration pattern of the device sensed by the sensing unit; and
   an alarm processing unit to provide an alarm corresponding to the judged environment, wherein the alarm processing unit controls the strength of the vibration to be provided as the alarm according to the vibration pattern of the device.

2. The device of claim 1, wherein the sensing unit comprises an inertia sensor.

3. The device of claim 2, wherein the inertia sensor comprises at least one of an accelerometer, a gyroscope, a shock sensor, and a tilt sensor.

4. The device of claim 1, wherein the sensing unit measures an acceleration to be applied to the device on the basis of at least one reference axis and extracts the vibration pattern using the measurement result of the acceleration.

5. The device of claim 1, wherein the vibration unit causes the device to vibrate when a predetermined event is generated.

6. The device of claim 1, wherein the vibration unit causes the device to vibrate for a critical time.

7. The device of claim 1, wherein the vibration pattern comprises an amount of the vibration or a vibration frequency.

8. The device of claim 7, wherein the amount of the vibration is a difference between upper and lower peak values of the acceleration of the device that is measured on the basis of at least one reference axis.

9. The device of claim 1, wherein the alarm processing unit provides an alarm that corresponds to a reference pattern most similar to the vibration pattern of the device among predetermined stored reference patterns.

10. The device of claim 1, wherein the type of alarm may include at least two of the vibration, sound, and lamp lighting.

11. The device of claim 1, wherein the alarm processing unit controls the vibration unit to vibrate the device at a strength determined according to the vibration pattern of the device.

12. A method for analyzing an environment of a device, the method comprising:
  causing a device to vibrate;
  sensing vibration of the device, wherein the vibration forms a vibration pattern;
  judging an environment of the device according to the sensed vibration pattern of the device; and
  providing an alarm corresponding to the judged environment,
  wherein the providing of the alarm comprises causing the device to vibrate at a strength among a plurality of strengths on the basis of the vibration pattern of the device.

13. The method of claim 12, wherein the sensing comprises:
  measuring an acceleration to be applied to the device on the basis of at least one reference axis; and
  extracting the vibration pattern using the measured acceleration.

14. The method of claim 12, wherein the causing the device to vibrate comprises causing the device to vibrate when a predetermined event is generated.

15. The method of claim 12, wherein the causing the device to vibrate comprises causing the device to vibrate for a critical time.

16. The method of claim 12, wherein the vibration pattern comprises at least one of an amount of the vibration and a vibration frequency.

17. The method of claim 11, wherein the amount of the vibration is a difference between upper and lower peak values of the acceleration of the device that is measured on the basis of at least one reference axis.

18. The method of claim 12, wherein the providing of the alarm comprises providing an alarm that corresponds to a reference pattern most similar to the vibration pattern of the device among predetermined stored reference patterns.

19. The method of claim 12, wherein the type of alarm may include at least two of the vibration, sound, and lamp lighting.

20. At least one non-transitory computer readable medium storing computer readable instructions that control at least one processor to implement the method of claim 12.

21. A device having a predetermined data arithmetic processing ability, the device comprising:
  a vibration unit to cause the device to vibrate;
  a sensing unit to sense vibration of the device, wherein the sensed vibration forms a vibration pattern;
  a judgment unit to judge an environment of the device according to the vibration pattern of the device sensed by the sensing unit; and
  an alarm processing unit to provide an alarm corresponding to the judged environment,
  wherein the alarm processing unit controls the volume of sound to be provided as the alarm according to the vibration pattern of the device.

22. The device of claim 21, wherein the type of alarm may include at least two of the vibration, sound, and lamp lighting.

23. A method for analyzing an environment of a device, the method comprising:
  causing a device to vibrate;
  sensing vibration of the device, wherein the vibration forms a vibration pattern;
  judging an environment of the device according to the sensed vibration pattern of the device; and
  providing an alarm corresponding to the judged environment,
  wherein the providing of the alarm comprises causing the device to control sound at a volume among a plurality of volumes on the basis of the vibration pattern of the device.

24. The method of claim 23, wherein the type of alarm may include at least two of the vibration, sound, and lamp lighting.

* * * * *

UNITED STATES PATENT AND TRADEMARK OFFICE
CERTIFICATE OF CORRECTION

| | | |
|---|---|---|
| PATENT NO. | : 8,131,252 B2 | |
| APPLICATION NO. | : 11/898782 | |
| DATED | : March 6, 2012 | |
| INVENTOR(S) | : Byung-seok Soh et al. | |

It is certified that error appears in the above-identified patent and that said Letters Patent is hereby corrected as shown below:

Title Page Item [56] Line 3, Delete "of" and insert -- Office --, therefor.

Claim 8, Line 10, In Claim 17, delete "claim 11," and insert -- claim 16, --, therefor.

Signed and Sealed this
Twenty-second Day of May, 2012

David J. Kappos
*Director of the United States Patent and Trademark Office*